US007810712B2

(12) United States Patent
Berger et al.

(10) Patent No.: US 7,810,712 B2
(45) Date of Patent: Oct. 12, 2010

(54) METHOD AND DEVICE FOR TRANSPORTING ITEMS BY MEANS OF IDENTIFIED CONTAINERS

(75) Inventors: Gisbert Berger, Berlin (DE); Jörg-Andreas Illmaier, Kreuzlingen (CH)

(73) Assignee: Siemens AG, Munich (DE)

( * ) Notice: Subject to any disclaimer, the term of this patent is extended or adjusted under 35 U.S.C. 154(b) by 176 days.

(21) Appl. No.: 12/212,674

(22) Filed: Sep. 18, 2008

(65) Prior Publication Data

US 2009/0078754 A1 Mar. 26, 2009

(30) Foreign Application Priority Data

Sep. 18, 2007 (DE) ....................... 10 2007 044 736
Dec. 3, 2007 (DE) ....................... 10 2007 057 985
Apr. 4, 2008 (DE) ....................... 10 2008 017 186

(51) Int. Cl.
*G06K 17/00* (2006.01)
*G06F 19/00* (2006.01)
*G06Q 30/00* (2006.01)
*G06Q 90/00* (2006.01)
*G07B 15/02* (2006.01)

(52) U.S. Cl. ....................... 235/375; 235/383; 235/384; 235/385

(58) Field of Classification Search ................. 235/375, 235/383, 385
See application file for complete search history.

(56) References Cited

U.S. PATENT DOCUMENTS 6,888,084 B1 5/2005 Bayer
7,356,162 B2 4/2008 Caillon
2003/0160096 A1* 8/2003 Morimoto .................. 235/375
2004/0049315 A1 3/2004 Sansone et al.
2004/0181310 A1* 9/2004 Stashluk et al. ............. 700/226
2004/0194056 A1* 9/2004 Combs et al. ............... 717/104
2005/0269395 A1 12/2005 Miette et al.
2005/0288947 A1* 12/2005 Mallonee et al. ............... 705/1
2006/0091206 A1* 5/2006 Olsen et al. ................. 235/384
2006/0253406 A1 11/2006 Caillon
2007/0095905 A1* 5/2007 Kadaba ...................... 235/384
2007/0215529 A1 9/2007 Desprez et al.
2008/0149540 A1 6/2008 Olivier et al.

FOREIGN PATENT DOCUMENTS

EP 1 222 037 B1 7/2007
FR 2866252 A1 8/2005

* cited by examiner

*Primary Examiner*—Thien Minh Le
*Assistant Examiner*—Tuyen K Vo
(74) *Attorney, Agent, or Firm*—Laurence A Greenberg; Werner H Stemer; Ralph E Locher

(57) ABSTRACT

A method and a device transport multiple items, in particular mail items, to predefined destination points. The respective destination point and a value of a predefined feature of each item are measured and stored. The item is transported together with other items in a transport device to an intermediate point. The transport device is furnished with a label which has a machine-readable identification. The identification is read. The transport device in which an item was transported is determined by the measure. After transportation to the intermediate point a value of the feature is measured afresh. In order to find a stored data record, a restriction is implemented on the search space to the data records of those items which were transported in the same transport device.

12 Claims, 3 Drawing Sheets

METHOD AND DEVICE FOR TRANSPORTING ITEMS BY MEANS OF IDENTIFIED CONTAINERS

BACKGROUND OF THE INVENTION

Field of the Invention

The invention relates to a method and a device for transporting multiple items, in particular mail items.

A mail item typically passes through a sorting system at least twice and is then transported to the respectively predefined delivery address. The delivery address of the mail item is read during the first pass. The read delivery address is determined again during the second pass. The mail item is then transported to the determined delivery address.

Traditionally, a coding of the destination address is printed onto the mail item during the first pass. This coding is read during the second pass. In order to avoid printing on mail items, it is proposed in DE 4000603 C2 that a feature vector of the mail item be measured during the first pass and this feature vector stored together with the read destination address. During the second pass, the mail item is measured afresh, a further feature vector being generated by this means. This further feature vector is compared with the stored feature vectors in order to find the stored feature vector of the same item. The destination address which is stored together with the found feature vector is used as the destination address to which the mail item is to be transported.

This search requires that many feature vectors be compared with one another, which is time-consuming. As the number of transported mail items grows, the risk that the wrong feature vector will be found among the stored feature vectors increases. Restrictions on the search space have therefore already been proposed.

A method comprising the features of the preamble of claim 1 and a device comprising the features of the preamble of claim 12 is known from EP 1222037 B1. The items there are likewise mail items which pass through sorting machines. Such a sorting machine discharges mail items into sorting terminals which function as intermediate stores. In order to reuse read results, a method is used which is known as fingerprinting and which is presented e.g. in DE 4000603 A1.

For each mail item, a data record is generated and filed in a central database. This data record comprises the read delivery address. In order to restrict the search space when searching for this data record, a record is stored of which mail item is transported in which container. This approach requires that the identifier of the container be read. This identifier is read while the container is being fed or transported away.

BRIEF SUMMARY OF THE INVENTION

The object of the invention is to provide a method comprising the features of the preamble of claim 1 and a device comprising the features of the preamble of claim 12, in which determination of the transport means used respectively does not require that a reading device be located in proximity to the transport means.

The object is achieved by a method comprising the features of claim 1 and a device comprising the features of claim 12. Advantageous embodiments are specified in the subclaims.

Each item is furnished with at least one character, in particular with details of the predefined destination point to which this item is to be transported.

For each item, the at least one character with which this item is furnished is read. Furthermore, for each item, a value which a predefined feature assumes for this item is measured.

For each item, one data record is stored respectively. This data record comprises

- the at least one character on the item which has been read respectively and
- the measured feature value.

Each item is transported with the aid of a transport means to one predefined intermediate point respectively. Here, each transport means which is used for transportation to an intermediate point is furnished respectively with a label. This label has a machine-readable label identification.

For each transport means, transport information is stored:

- what label identification the label with which the transport means is furnished has, and
- what items are being transported with the aid of this transport means.

For each transport means used, the identification of the label with which this transport means is furnished is read. The transport information is analyzed. In this way, a measurement is made of which items are transported in this transport means.

For each item, the following steps are executed after transportation to the respective intermediate point:

- A fresh measurement is made of what value the feature assumes for this item.
- The particular data record which has been stored for this item is determined among stored data records.
- The feature value obtained during the fresh measurement is used in order to determine this data record. The item is identified with this at least one feature value.
- Furthermore, in order to determine the data record for this item, a search-space restriction is implemented. The search space is restricted to the data records of those items which have been transported in the determined transport means.

Depending on the character read in the data record, further transportation of the item is triggered, for example at the time point which was read previously.

The invention thus provides for furnishing the label used in each case with an identifier. Instead of bringing a reading device within proximity of the transport means and reading the identifier of the transport means, an identifier of this label is read. In order to read this, it is not therefore necessary to bring the transport means within the proximity of a reading device or to bring a mobile reading device within the proximity of the transport means. The label can be transported much more easily than a transport means or a mobile reading device.

The invention can also be used without major modifications in letter-sorting systems commonly used today. These installations do not have stationary reading devices which are mounted such that they can read a container identifier while containers are being loaded or removed.

In one embodiment, each item is furnished with details of the respectively predefined destination point to which this item is to be transported. In particular, the item is a mail item or a freight consignment. In another embodiment, the item is a luggage item of a passenger and is furnished with details relating to the owner. This luggage item is to be transported to a destination address which depends on the identity of the passenger.

Preferably, the respective label of each transport means is read after the transport means has been transported to the intermediate point. Multiple transport means usually arrive at this intermediate point. The transport means can be distinguished by reading the respective identifications on the labels.

The label is preferably guided past a stationary reading device. A stationary reading device can be more easily shielded than a mobile reading device and can be heavier and therefore also more powerful.

The label is preferably used only once. After the transport means with the label has reached the predefined intermediate point, the label is discarded. During this process, the label identification is read.

The transport means is e.g. a container or a vehicle, e.g. an unpowered trailer which is pulled by a motor tractor or pushed by a machine operator. The items are e.g. mail items, passengers' luggage items or else production items which are transported from one production plant to another production plant.

The invention will be described below with reference to an exemplary embodiment. Here:

DESCRIPTION OF THE INVENTION

In the exemplary embodiment, the items to be transported are mail items. Each mail item is furnished with an identification of the particular delivery address to which this mail item is to be transported. The delivery address functions as the destination point of the mail item. The identification has usually been affixed to the mail item before the commencement of transportation. It is, however, also possible that it will be affixed only during transportation.

Figure 1:
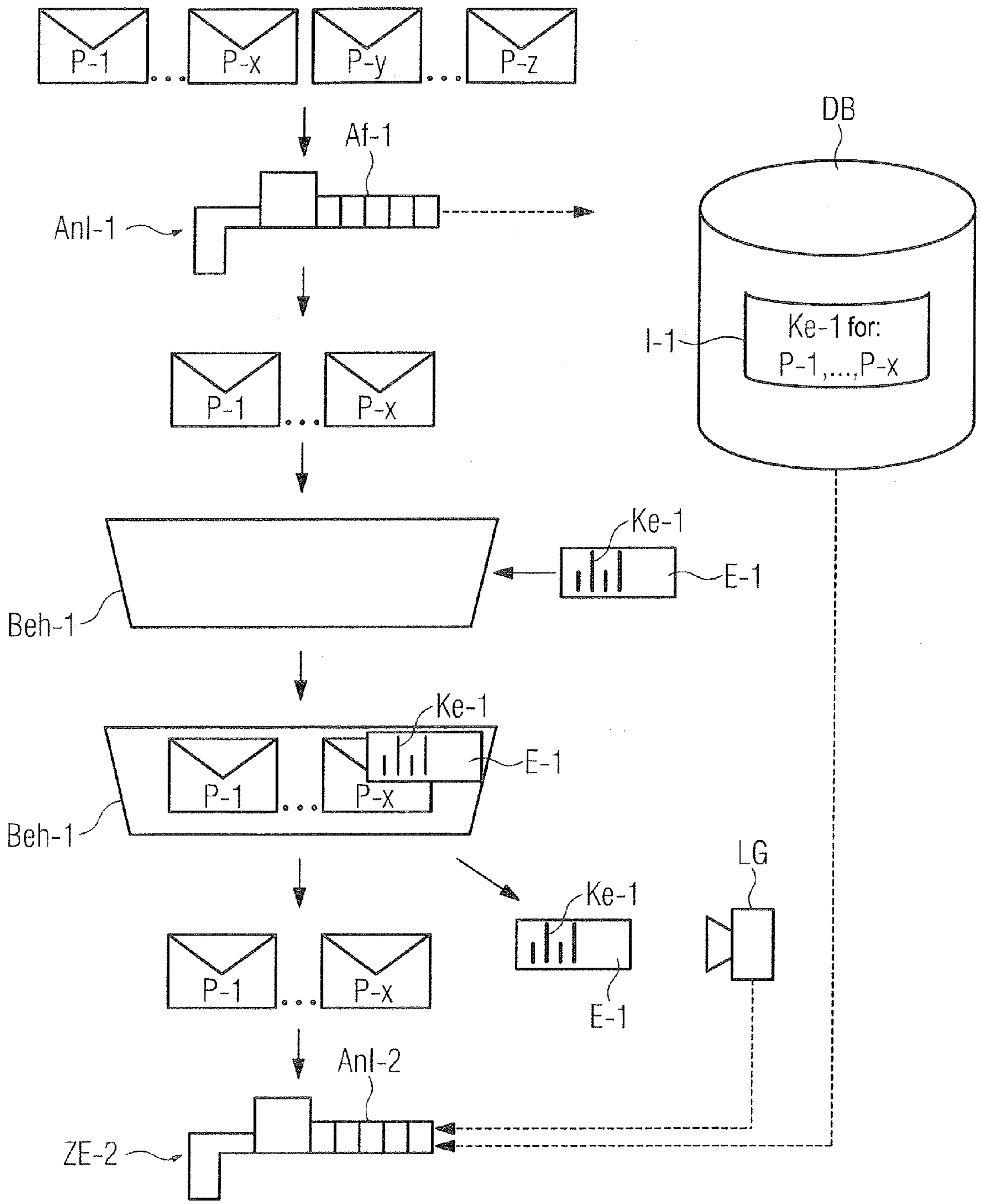
FIG. 1 shows schematically the implementation of the exemplary embodiment.

FIG. 1 illustrates schematically the implementation of the exemplary embodiment. Shown are two sorting systems Anl-1 and Anl-2, a central database DB, a reading device LG and a container Beh-1. The first sorting system Anl-1 has an output compartment Af-1, and the second sorting system Anl-2 a feeding device ZE-2. The container Beh-1 has a label E-1 which is identified by means of a machine-readable identifier Ke-1. Material flows are represented by solid lines, data flows by dashed lines.

Each mail item passes through a sorting system at least twice. It is possible for a mail item to pass through the same sorting system several times or through one sorting system three times. The sorting system used during the first pass is designated the first sorting system Anl-1 and the sorting system used during the second pass the second sorting system Anl-2.

In the example from FIG. 1, the mail items P-1, . . . , P-x, P-y, . . . , P-z pass through the first sorting system Anl-1. Then the mail items P-1, . . . , P-x pass through the second sorting system Anl-2 and the remaining mail items through a further sorting system which is not shown.

During the first pass, at least the delivery address is determined. It is possible for further parameters to be measured, e.g. the weight of the mail item or the franking with which the mail item is provided.

Preferably, a reading device of the first sorting system Anl-1 initially attempts to determine the delivery address automatically by means of optical character recognition (OCR). If this is unsuccessful, then a person reads the delivery address and inputs at least a part of the read delivery address, e.g. the zip code, into a video coding station. The sorting address discharges the mail item, depending on the delivery address recognized, into one of multiple output compartments.

Mail items which the first sorting system Anl-1 has discharged into a defined output compartment Af-1 are transferred into a container automatically or manually by a machine operator. This container functions as one of the transport means. In the example from FIG. 1 this is the container Beh-1. As mail items are transferred into the container Beh-1, the output compartment Af-1 is emptied completely or at least to a large extent. The container Beh-1 is furnished with a label E-1. This label E-1 specifies in the example from FIG. 1 the location to which the container with the mail items is to be transported. This location is referred to below as an "intermediate point", as it is an intermediate point on the pathway of the mail items in the container Beh-1 to the respective delivery address.

The first sorting system Anl-1 fills the output compartment Af-1 afresh. The output compartment Af-1 is emptied afresh, either completely or partially, into a container. This container can be the same container Beh-1 or a different container from that into which the output compartment was emptied the first time. This further container is also transported to a further intermediate point which is specified by a label. This further intermediate point may be the same as that to which the first container was transported or a different intermediate point.

In the exemplary embodiment, each intermediate point is a feeding device relating to a second sorting system Anl-2, for example a feeder of this second sorting system Anl-2. The container with the mail items is transported to this intermediate point and emptied there. The mail items from the container are fed to the second sorting system Anl-2. This second sorting system Anl-2 determines the delivery address of each mail item which the first sorting system Anl-1 has read. Then, the second sorting system Anl-2 in turn discharges the mail item into one of the output compartments, depending on the delivery address. Transportation of the mail item to this delivery address is initiated.

In the example from FIG. 1, the mail items P-1, . . . , P-x, P-y, . . . , P-z are discharged into an output compartment Af-1 of the first sorting system Anl-1. The mail items P-1, . . . , P-x are then transferred from the output compartment Af-1 into the container Beh-1. The container Beh-1 with the mail items P-1, . . . , P-x is transported to the feeding device ZE-2. There, the container Beh-1 is unloaded, and the mail items P-1, . . . , P-x are fed via the feeding device ZE-2 to the second sorting system Anl-2.

A delivery area is assigned to each possible delivery address. During each pass, all mail items to the same delivery area are discharged into the same output compartment. It is possible for a mail item to pass through the same sorting system several times, for example because the number of output compartments is lower than the number of predefined delivery areas. In this case, 2-pass sequencing is preferably executed. Such a method is known from EP 948416 B1. After the first pass, the mail items which the first sorting system Anl-1 has discharged into an output compartment are transferred into a container. The container is transported to the feeding device ZE-2 of the second sorting system Anl-2, and the mail items are fed into the sorting system for the second pass.

It is also possible for a container with mail items that have passed through a sorting system for the first time to be transported to a different location and fed there into the second sorting system Anl-2. It is also possible for some mail items to be transported in a container from an output compartment of the second sorting system Anl-2 to a feeding device of a third sorting system and for these mail items to be fed into the third sorting system.

It would be highly inexpedient if the second sorting system Anl-2 and each further sorting system had to read afresh the delivery address which the first sorting system Anl-1 has already read. The classic procedure for avoiding this is for the first sorting system Anl-1 to print a coding of the delivery address on to the mail item, e.g. in the form of a bar code. The second sorting system Anl-2 and each further sorting system reads this bar code.

However, it is frequently not desirable for a mail item to be furnished with a bar code. An agreement of the Universal Postal Union (UPU) provides that cross-border mail items shall not be furnished with a bar code, since different postal service providers normally use different coding systems.

Therefore, in the exemplary embodiment a method is used which has come to be known by the name of "fingerprinting" or "virtual ID" and is described e.g. in DE 4000603 C2 and EP 1222037 B1 and which enables each further sorting system to determine without a bar code the particular delivery address which the first sorting system Anl-1 has read.

In the exemplary embodiment, various features of a mail item which can be measured externally are predefined. Examples of such features are:

- dimensions of the mail item,
- the distribution of gray levels and/or color tones on a surface of the mail item,
- the position and dimension of the franking mark,
- the position and size of the address block and/or of the details relating to the sender and
- parameters of the delivery address, e.g. the zip code.

In the exemplary embodiment, each sorting system is connected to the same central database DB. Once a mail item passes through the first sorting system Anl-1, a data record is generated for this mail item and stored in the central database DB. This data record comprises

- a clear identifier of the mail item,
- the destination address which the first sorting system Anl-1 has read and
- optionally, further parameters of the mail item, e.g. its weight or its franking.

In the example from FIG. 1, the two sorting systems Anl-1 and Anl-2, as well as further sorting systems which are not shown, are both connected to the same central database DB and have read and write access to this database DB.

The first sorting system Anl-1 measures for each mail item which passes through the first sorting system Anl-1 and for each predefined feature the value which this feature assumes for this mail item. In this way, the first sorting system Anl-1 generates a feature vector for the mail item. Where there are N features, this feature vector consists of N feature values. The data record for the mail item also comprises, besides the delivery address, the feature vector.

The second sorting system Anl-2 and each further sorting system which the mail item passes through measures afresh for each feature the respective value which the feature assumes for this mail item. In this way, the further sorting system likewise generates a feature vector, consisting of N feature values, for the mail item. This feature vector is compared with the feature vectors of data records which are stored in the central database DB. The particular data record which was generated during the passage of the mail item through the first sorting system Anl-1 and originates from the same mail item is found by this means. The second sorting system Anl-2 and each further sorting system uses the delivery address of this data record as the delivery address to which this mail item is to be transported.

Because a large number of mail items pass through each sorting system on a single day, it would be inexpedient if in the process the feature vector which the second sorting system Anl-2 has generated were to be compared with all the feature vectors from the first sorting system Anl-1. This requires too much computing time. Particularly where there are many mail items, the risk that an incorrect feature vector will be found also increases. The search space is therefore restricted.

Methods for restricting the search space are known from DE 19947259 C1, EP 1222037 B1 and U.S. Pat. No. 6,888,084 B1. The invention reveals a different way of doing this. Thanks to the invention, the normal process sequences do not need to be modified substantially nor is a considerable additional outlay on machinery necessary.

As already explained, in the example from FIG. 1 the container Beh-1, in which mail items P-1, . . . , P-x are transported from an output compartment Af-1 of the first sorting system Anl-1 to a feeding device ZE-2 of the second sorting system Anl-2, is furnished with a label E-1. This label E-1 specifies the intermediate point to which the container with the mail items in it is to be transported, i.e. in this case a defined feeding device ZE-2 of a defined sorting system Anl-2 or else a sorting system at a different location.

According to the invention, the label E-1 additionally has a machine-readable identification Ke-1 which distinguishes this label E-1 from other labels which are used for transporting mail items. The label identification Ke-1 is preferably machine-readable. The identification preferably distinguishes this label E-1 from all other labels which are used within a predefined time period for transporting mail items.

The label E-1 is made, for example, out of rigid paper, cardboard or plastic. The identification Ke-1 is printed onto the label in the form of a machine-readable bar code. It is also possible for the identification Ke-1 to be printed in a form readable by a person and in a form readable by a machine. In another embodiment, the label E-1 takes the form of an electronic data carrier, e.g. an RFID chip. The identification of the intermediate point and the identification Ke-1 of the label are stored in this data carrier. The data carrier can preferably be read out contactlessly.

The first sorting system Anl-1 determines for each output compartment what identification the label has with which the container into which the mail items are transferred from the output compartment is furnished. For each mail item, and thus also for each mail item which is transferred from the output compartment into the container, a data record comprising the feature vector and the read delivery address is stored in the central database DB. This data record is supplemented with the identification of the label.

It is not necessary for the first sorting system Anl-1 to determine an identification which is rigidly connected to the container. For this would either require that a mobile reading device be used or that the container to be read be brought within the proximity of a stationary reading device. Thanks to the invention, however, it suffices for the identification Ke-1 on the label E-1 to be read.

Or information as to which mail items are being transported in the container which has a label with a certain identification is stored in the central database DB.

In the example shown in FIG. 1, information is stored in the central database DB that the mail items P-1, . . . , P-x are being transported in a container which is furnished with a label which has the identifier Ke-1. This information is designated transport information I-1.

The container Beh-1 from FIG. 1 is furnished with a label E-1. The filled container Beh-1 is transported to a feeding device ZE-2 of the second sorting system Anl-2. There, the mail items are removed from the container Beh-1 and placed onto the feeding device ZE-2.

The container with the mail items and the label is transported in the example from FIG. 1 to the second sorting system Anl-2. The second sorting system Anl-2 determines the identification with which the label is furnished. The mail items from this container then pass through the second sorting system Anl-2. For each of these mail items the second sorting system Anl-2 determines, as described above, one feature vector respectively. In order, in respect of a mail item from the container, to search among the stored data records for the data record which originates from the mail item, the following data is used:

the feature vector which the second sorting system Anl-2 has measured, and the identification of the label which the second sorting system Anl-2 has read.

Again, it is not necessary to read an identification which is rigidly connected to the container Beh-1.

The search for the data record is restricted to those stored data records which have the same label identifier. This is because the mail item has been transported in the container with this label from the first sorting system Anl-1 to the second sorting system Anl-2. Only the feature vectors of those data records which comprise this label identification are compared with the feature vector which was measured by the second sorting system Anl-2. As a result, considerably fewer comparisons of feature vectors are required than if all the feature vectors had to be compared. The risk that the incorrect data record will be selected decreases because the label identification is used as an additional distinguishing feature.

In the example from FIG. 1, the reading device LG reads the identifier Ke-1 with which the label E-1 on the container Beh-1 is furnished. By means of read access to the central database DB, the second sorting system Anl-2 determines that the mail items P-1, . . . , P-x were transported in the container with the label identification Ke-1.

Various embodiments will firstly be described below, indicating how the first sorting system Anl-1 determines the identification of a label.

In one embodiment, the first sorting system Anl-1 prints the labels itself and furnishes them with the identification of the intermediate point. Each label is furnished with an identifier for example as soon as it is fed to the first sorting system Anl-1. For example, the labels which are fed to the first sorting system Anl-1 are provided with ascending numbering. The first sorting system Anl-1 prints the consecutively numbered labels with an identification of the respective intermediate point.

In a different embodiment, each container is furnished with a machine-readable identifier. This identifier distinguishes the container from all other containers which are used for transporting mail items. The first sorting system Anl-1 reads the identifier of this container. The read container identifier is used as the identification of the label. The first sorting system Anl-1 prints the read container identifier and the identification of the respective intermediate point onto the label.

In both embodiments, the first sorting system determines the identification with which the label is or will be furnished. The first sorting system Anl-1 stores this label identification as described above, namely as part of each data record which is generated and stored for a mail item in the container.

Various embodiments are also described below, describing how the second sorting system Anl-2 determines the identification Ke-1 of a label E-1. At least one reading device LG which reads the identification Ke-1 on the label E-1 is used in each embodiment. As explained above, a container with mail items and the label E-1 is transported to an intermediate point which is predefined by the label E-1. In the example from FIG. 1 this intermediate point is a feeding device ZE-2 of a second sorting system Anl-2. The second sorting system Anl-2 reads the label identification.

It is possible for the label to remain on the container during and after the unloading of the container. The container is constructed such that a stationary reading device can read the label identification.

Figure 2:
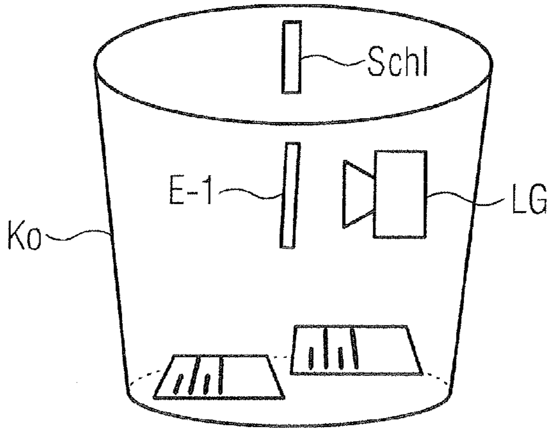
FIG. 2 shows a basket for used labels with a reading device for the labels.

In a preferred embodiment, however, the label E-1 is removed before or during the unloading of the container Beh-1 and placed in a basket Ko for storing used labels. This basket Ko is e.g. a waste bin. The label identification Ke-1 is read on the way from the container Beh-1 to the basket Ko or even in the basket Ko. FIG. 2 illustrates this preferred embodiment.

In an embodiment shown in FIG. 2 the basket Ko is furnished with a slot Schl. A label is posted through this slot Schl and then falls into the basket. The basket Ko is furnished with a stationary reading device. After the label has fallen through the slot Schl, it moves past the reading device LG. The reading device LG reads the label identification Ke-1. The label E-1 is preferably furnished on both sides with the label identification Ke-1 so that it does not matter which side of the label E-1 is facing the reading device LG when the label is posted. The slot Schl is preferably embodied such that it is wider than the transverse edge and narrower than the longitudinal edge of the label E-1. Only two positions are then possible in which the label E-1 can be pushed through the slot Schl.

Figure 3:
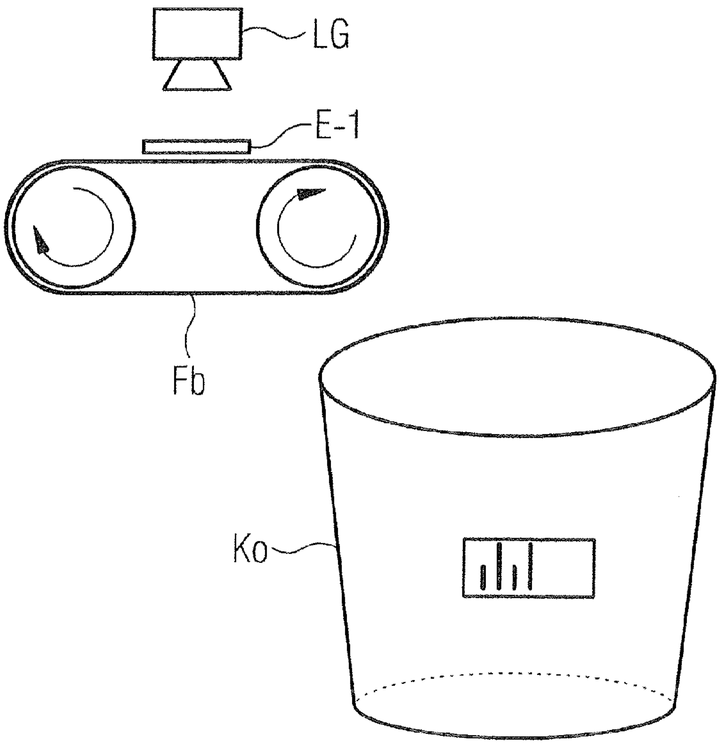
FIG. 3 shows a conveyor belt, which transports labels to a basket for used labels and above which a reading device is mounted.

FIG. 3 shows an alternative embodiment. In the embodiment shown in FIG. 3 the label E-1 is placed horizontally on a conveyor belt Fb. A stationary reading device LG, which is pointed toward the conveyor belt Fb, is located above the conveyor belt Fb. This reading device LG reads the label identification Ke-1 on the label E-1, while the label E-1 lying on the conveyor belt Fb is guided past the reading device LG. Also, in this alternative embodiment, the label E-1 is preferably printed with the label identification Ke-1 on both sides. This design saves on the need for an operator to insert the labels though a slot Schl of the basket Ko. Instead, the labels fall from the conveyor belt Fb into the basket Ko, which is open on top.

Figure 4:
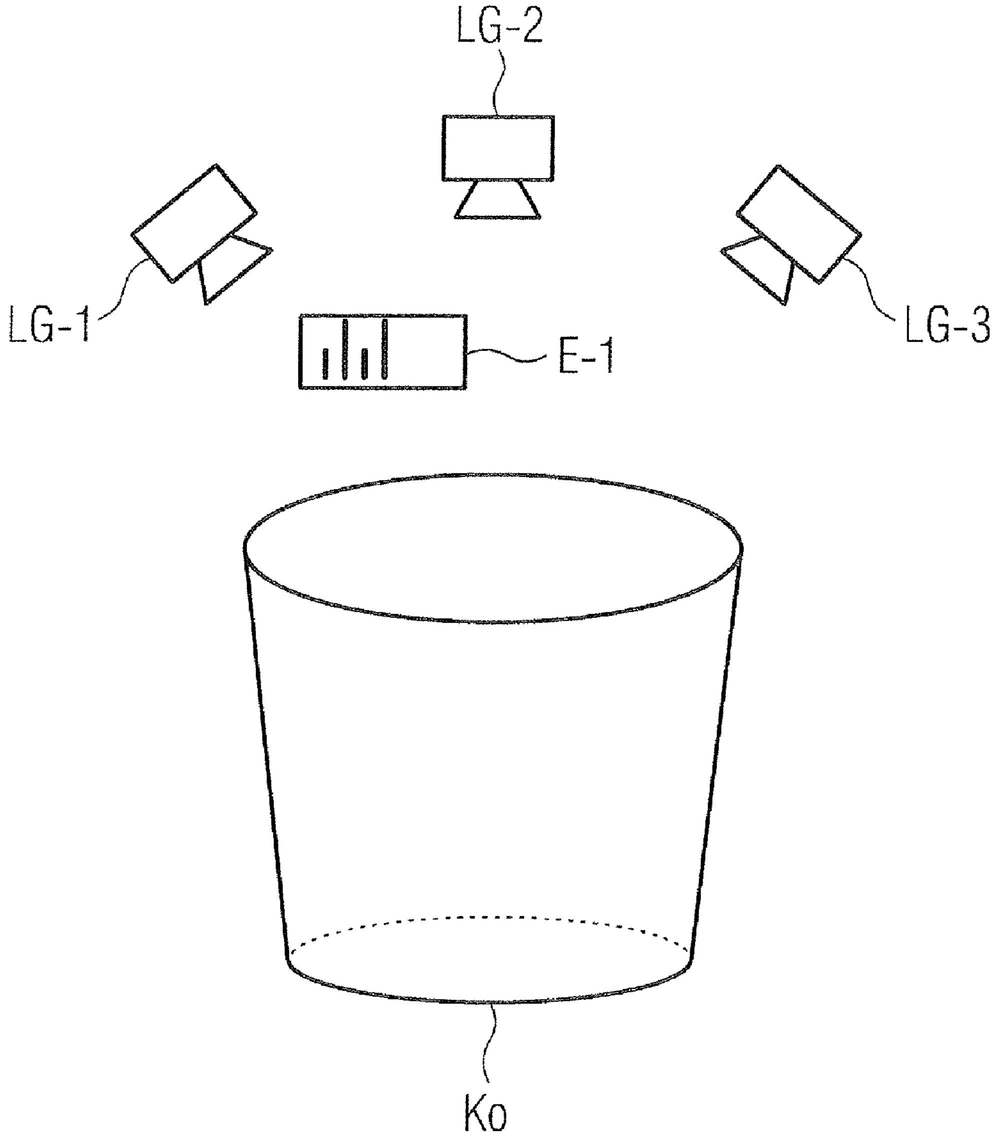
FIG. 4 shows a basket for used labels, above which multiple stationary reading devices are mounted.

In a further alternative embodiment, which is shown in FIG. 4, the basket Ko is again open at the top. Multiple stationary reading devices LG-1, LG-2, LG-3 are arranged above the basket Ko. These are arranged such that at least one of the reading devices LG-1, LG-2, LG-3 can read the label identification Ke-1 if the label E-1 is inserted in the basket Ko, irrespective of the position in which the label E-1 is inserted.

LIST OF REFERENCE CHARACTERS

| Reference characters | Meaning |
|---|---|
| Af | Output compartment of the first sorting system Anl-1 |
| Anl-1 | First sorting system |
| Anl-2 | Second sorting system |
| Beh-1 | Container with label E-1 |
| E-1 | Label with which the container Beh-1 is furnished |
| Fb | Conveyor belt for transporting used labels |

-continued

| Reference characters | Meaning |
|---|---|
| I-1 | Transport information that the mail items P-1, . . . , P-x are being transported in the container with the label identification Ke-1 |
| Ke-1 | Identifier of the label E-1 |
| Ko | Basket for used labels |
| LG | Reading device |
| LG-1, LG-2, LG-3 | Stationary reading devices above the basket Ko |
| P-1, . . . , P-x | Mail items which are transported in the container Beh-1 |
| P-y, . . . , P-z | Further mail items which are discharged by Anl-1 |
| Schl | Slot in the lid of the basket Ko |
| ZE-2 | Feeding device of the second sorting system Anl-2 |

The invention claimed is:

1. A method for transporting items each being furnished with at least one character, which comprises the steps of:

reading the at least one character on each of the items;

measuring a value of a predefined feature for each of the items resulting in a measured feature value;

storing for each of the items a data record containing the at least one character read on an item and the measured feature value;

transporting each of the items with an aid of a transport device to a predefined intermediate point respectively;

furnishing the transport device used for transportation to the predefined intermediate point with one label, the label having a machine-readable label identification;

determining for each of the items, the transport device with which the items are transported resulting in a determined transport device;

storing, for each transport device used, transport information as to which label identification the label has with which the transport device is furnished, and which items are transported with the aid of the transport device and the determination, executed for each of the items, of the transport device in which the item was transported, further comprises the steps of:

reading, for each transport device used, the label identification of the label with which the transport device is furnished; and analyzing the transport information;

performing a fresh measurement of what value the predefined feature assumes for each of the items after transportation to the predefined intermediate point;

using the predefined feature value obtained in the fresh measurement for determining the data record stored for the item from among stored data records resulting in a determined data record, whereby in determining the data record for the item, a search-space restriction is implemented to the data records of the items which were transported in the determined transport device; and triggering further transportation of the item, depending on a particular read character which is contained in the determined data record.

2. The method according to claim 1, which further comprises carrying out the reading of the label identification of the label of the transport device after the transport device has been transported to the predefined intermediate point.

3. The method according to claim 2, which further comprises after the transportation of the transport device and the reading of the label identification, determining through analysis of the transport information which of the items were transported in the transport device to the predefined intermediate point, and for each of the items transported in the transport device, determining the data record which is stored for the item among the data records which are stored for the items transported in the transport device.

4. The method according to claim 1, wherein at least one of the labels with which a used transport device is furnished contains an identification of the predefined intermediate point to which the transport device is to be transported.

5. The method according to claim 1, which further comprises furnishing the transport device with a transport device identifier and the transport device identifier is furnished as the label identification of the label with which the transport device is furnished.

6. The method according to claim 1, wherein for at least one transport device, the reading of the label identification of the label of the transport device comprises the steps of:

separating the label from the transport device; and guiding the label past a stationary reading device, which reads the label identification.

7. The method according to claim 6, which further comprises:

introducing the label into a slot; and subsequently guiding the label past the reading device.

8. The method according to claim 1, which further comprises furnishing the label on two surfaces of said transport device with the same label identification and the label identification of the label of one of the two surfaces is read.

9. The method according to claim 1, which further comprises repeatedly furnishing the transport device with one label respectively which has an identification of a predefined intermediate point and an identification of the label;

repeatedly filling the transport device with at least one item;

repeatedly transporting the transport device to the predefined intermediate point; and repeated removing each of the items from the transport device.

10. The method according to claim 1, which further comprises:

furnishing each of the items with details of a predefined destination point to which the items are to be transported; and performing the reading of the character on the item by the step of reading details with which the item is furnished and further transportation of the item to a respectively read destination point is triggered.

11. The method according to claim 1, wherein the item is a mail item.

12. A device for transporting items each having at least one character, the device comprising:

a reading device for reading the character on each of the items;

a first measuring device for measuring on each item respectively a value of a predefined feature for the item resulting in a measured feature value;

at least one transport device for transporting at least one item respectively to a predefined intermediate point;

a second measuring device;

a database;

a transport-device-determining device for determining for each of the items said transport device with which the item is transported resulting in a determined transport device;

a first data processing installation for storing in the database for each of the items respectively a data record containing a read character on the item and the measured feature value; and a second data processing installation for measuring afresh for each of the items, after transportation to the predefined intermediate point, the value which the feature assumes for the item, said second data processing installation configured for determining, using the feature value obtained in the fresh measurement, a particular data record among the data records stored in said database which is stored for the item, said second data processing installation, in determining the data record, implements a restriction on a search space to the data records of the items which were transported in said determined transport device;

means configured for triggering, depending on the particular read character which is contained in the determined data record, further transportation of each of the items;

said transport device used for transportation to the predefined intermediate point is furnished with one label respectively, the label having a machine-readable label identification;

said first data processing installation being configured for storing for each transport device information as to which label identification the label has with which said transport device is furnished, and which items are transported with an aid of said transport device; and said transport-device-determining device configured for reading, when determining for each item, after transportation of the item to the predefined intermediate point, said transport device used for transportation, the identification of the label with which said transport device used was furnished and said transport-device-determining device configured for carrying out, when carrying out for each item the determination of said transport device in which the item is transported, the steps of reading for each said transport device used, the identification of the label with which said transport device is furnished, and analyzing the transport information.

* * * * *